(12) United States Patent
Choi

(10) Patent No.: US 8,081,868 B2
(45) Date of Patent: Dec. 20, 2011

(54) TIME RECONCILIATION FOR IMAGE RECORDING DEVICES

(75) Inventor: Eun Sang Choi, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1325 days.

(21) Appl. No.: 11/670,603

(22) Filed: Feb. 2, 2007

(65) Prior Publication Data

US 2007/0269183 A1 Nov. 22, 2007

(30) Foreign Application Priority Data

May 17, 2006 (KR) .................. 10-2006-0044088

(51) Int. Cl.
*H04N 9/80* (2006.01)
(52) U.S. Cl. ................... 386/262; 386/327; 386/351
(58) Field of Classification Search .............. 386/262, 386/327, 351
See application file for complete search history.

(56) References Cited

U.S. PATENT DOCUMENTS 6,332,008 B1 * 12/2001 Giallorenzi et al. .......... 375/356
6,639,907 B2 * 10/2003 Neufeld et al. ............... 370/342
6,717,978 B1 * 4/2004 Yang et al. ................... 375/150

FOREIGN PATENT DOCUMENTS

| JP | 09-116536 | 5/1997 |
| JP | 2004-260390 | 9/2004 |
| JP | 2005-051470 | 2/2005 |

OTHER PUBLICATIONS

Office Action from Korean Patent Office, dated Jun. 25, 2007, Application No. 10-2006-0044088, 3 pages.
Notice of Allowance from Korean Patent Office, dated Oct. 31, 2007, Application No. 10-2006-0044088, 2 pages.

* cited by examiner

*Primary Examiner* — Helen Shibru
(74) *Attorney, Agent, or Firm* — Fish & Richardson P.C.

(57) ABSTRACT

Time reconciliation, in which images that each are associated with a recording device system time are received, the recording device records the images at an original rate, a reference time is determined, and a difference time D representing an amount of time that the recording device system time is ahead of the reference time is calculated. In one alternative implementation, a down-sampling rate N is determined, and a time T to reconcile the recording device system time with the reference time is calculated based upon the down-sampling rate N and the difference time D. In another alternative implementation, a time T is determined, and a down-sampling rate N to reconcile the recording device system time with the reference time is calculated based upon the time T and the difference time D. In both alternative implementations, the images recorded by the recording device are down-sampled at 1/N of the original rate, and the down-sampled images are stored.

14 Claims, 8 Drawing Sheets

TIME RECONCILIATION FOR IMAGE RECORDING DEVICES

CROSS-REFERENCE TO RELATED APPLICATIONS

This application claims priority to Korean Patent Application No. 10-2006-0044088, filed on May 17, 2006, which is incorporated herein by reference.

BACKGROUND

1. Field

The present disclosure generally relates to data storage, and one particular implementation relates to reconciling a recording device system time with a reference time while recording image data.

2. Description of the Related Art

Surveillance cameras are often used in association with recording devices, such as digital video recorders ("DVRs"), to capture and record images. Occasionally, the internally-measured recording device system time may not match a reference time. One example reference time is that obtained from a Network Time Protocol ("NTP") server, which provides time information via the Internet, in real-time.

SUMMARY

According to one general implementation, images associated with a recording device system time are received at a recording device, the recording device records the images at an original rate, a reference time is determined, and a difference time D representing an amount of time that the recording device system time is ahead of the reference time is calculated. Additionally, a down-sampling rate N is determined, and a time T to reconcile the recording device system time with the reference time is calculated based upon the down-sampling rate N and the difference time D. Furthermore, the images recorded by the recording device are down-sampled at 1/N of the original rate, and the images are stored.

Implementations may include one or more of the following features. For example, N may be an integer, and the recording device may be a digital video recorder. The reference time may be determined via an NTP server. The recording device system time may be reconciled with the reference time, after the images have been down-sampled for time T. The time T may be expressed as shown in Equation (1), below:

$$T = \frac{(D \times N)}{(N-1)}. \quad (1)$$

According to another general implementation, images associated with a recording device system time is received at a recording device, the recording device recording the images at an original rate, a reference time is determined, and a difference time D representing an amount of time that the recording device system time is ahead of the reference time is calculated. Additionally, a time T is determined, and a down-sampling rate N to reconcile the recording device system time with the reference time is calculated based upon the time T and the difference time D. Furthermore, the images recorded by the recording device are down-sampled at 1/N of the original rate, for a period of time T, and the images are stored.

The down-sampling rate N may be expressed as shown below, in Equation (2):

$$N = \frac{T}{(T-D)}. \quad (2)$$

According to another general implementation, a recording device includes an analog-to-digital converter configured to receive images generated at an original rate, a timer configured to measure a recording device system time for each of the images, and an interface configured to receive a reference time for each of the images. The recording device also includes a processor configured to determine a reference time for each of the images, calculate a difference time D representing an amount of time that the recording device system time is ahead of the reference time for each of the images, and determine a down-sampling rate N. The processor is also configured to calculate a time T to reconcile the recording device system time with the reference time based upon the down-sampling rate N and the difference time D, and down-sample the images received by the analog-to-digital converter at 1/N of the original rate. The recording device also includes a storage medium that records the down-sampled images.

According to another general implementation, a recording device includes an analog-to-digital converter configured to receive images generated at an original rate, a timer configured to measure a recording device system time for each of the images, and an interface configured to receive a reference time for each of the images. The recording device also includes a processor configured to determine a reference time, calculate a difference time D representing an amount of time that the recording device system time is ahead of the reference time, and to determine a time T. The processor is further configured to calculate a down-sampling rate N to reconcile the recording device system time with the reference time based upon the time T and the difference time D, and to down-sample images received by the analog-to-digital converter at 1/N of the original rate, for a period of time T. The recording device further includes a storage medium that records the down-sampled images.

According to another general implementation, images are received, with each image being associated with a recording device system time and a reference time, a difference time D representing an amount of time that the recording device system time differs from the reference time is calculated, and a time-stamp compression rate N is determined. Furthermore, a time T to reconcile the recording device system time with the reference time is calculated based upon the time-stamp compression rate N and the difference time D, and an adjusted time stamp is calculated for each of the images based upon the time-stamp compression rate N and the recording device system time. The adjusted time stamp is associated with each of the images, and the images and the adjusted time stamp associated with each of the images are stored.

According to another general implementation, images are received, with each image being associated with a recording device system time and a reference time, a difference time D representing an amount of time that the recording device system time differs from the reference time is calculated, and a time T is determined. A time compression rate N to reconcile the recording device system time with the reference time is calculated based upon the time T and the difference time D, and an adjusted time stamp is calculated for each of the images based upon the time-stamp compression rate N and the recording device system time. The adjusted time stamp is associated with each of the images, and the images and the adjusted time stamp associated with each of the images are stored.

According to another general implementation, a recording device includes a processor and an analog-to-digital converter configured to receive images that are each associated with a recording device system time and a reference time. The processor is configured to calculate a difference time D representing an amount of time that the recording device system time differs from the reference time, determine a time-stamp compression rate N, and calculate a time T to reconcile the recording device system time with the reference time based upon the time-stamp compression rate N and the difference time D. The processor is further configured to calculate an adjusted time stamp for each of the images based upon the time-stamp compression rate N and the recording device system time, and to associate the adjusted time stamp with each of the images. The recording device also includes a storage medium configured to store the images and the adjusted time stamp associated with each of the images.

According to another general implementation, a recording device includes a processor and an analog-to-digital converter configured to receive images that are each associated with a recording device system time and a reference time. The processor is configured to calculate a difference time D representing an amount of time that the recording device system time differs from the reference time, to determine a time T, and to calculate a time compression rate N to reconcile the recording device system time with the reference time based upon the time T and the difference time D. The processor is also configured to calculate an adjusted time stamp for each of the images based upon the time-stamp compression rate N and the recording device system time, and associate the adjusted time stamp with each of the images. The recording device also includes a storage medium configured to store the images and the adjusted time stamp associated with each of the images.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION OF PREFERRED EMBODIMENTS

Figure 1:
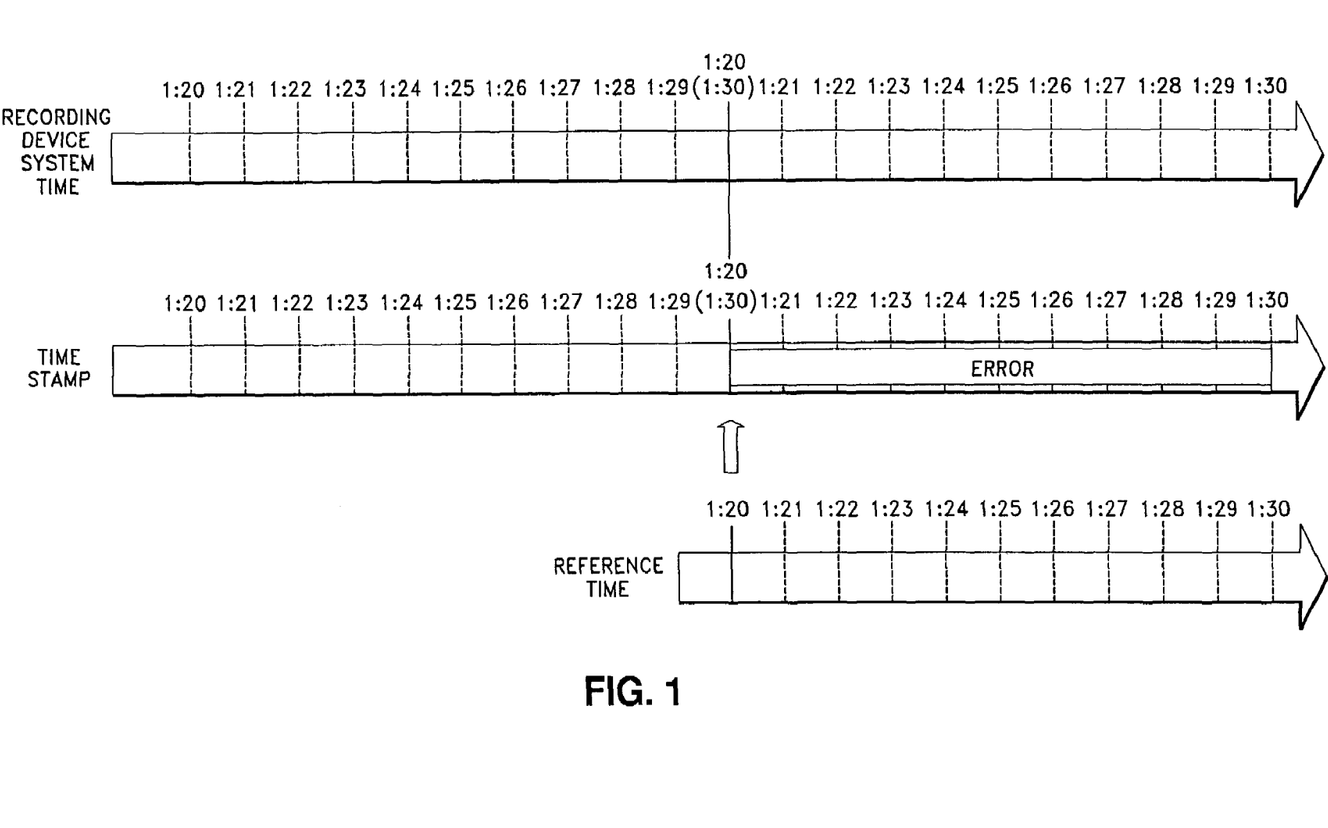
FIG. 1 illustrates time reconciliation in a situation where the recording device system time precedes a reference time.

FIG. 1 illustrates time reconciliation in a situation where a recording device system time precedes a reference time. For each of multiple images, the recording device associates and stores a time stamp with the image, where the time stamp is determined based upon the recording device system time. For example, when the recording device system time reads 1:30, the recording device associates and stores a time stamp of 1:30 with the image. The time stamp is also referred to as a time code or record time, and is typically used for synchronization or search functions.

In the illustrated example, the reference time is accessed at the moment when the recording device system time reads 1:30. Prior to this moment, for example when the recording device system time reads 1:20 to 1:29, the internally-measured recording device system time is associated with each image as a time stamp, such that the time stamp of each image recorded during recording device system times 1:20 to 1:29 also indicates a time stamp of 1:20 to 1:29.

Upon first reaching a recording device system time 1:30, the recording device accesses the reference time, such as by accessing the NTP server. In FIG. 1, for example, the reference time reads 1:20 at the moment that the recording device system time first reaches 1:30. Since the recording device system time does not match the reference time, the recording device system time is reset to match the reference time (e.g. the recording device system time is reset from 1:30 to 1:20).

In the case where the recording device system time is initially later than the reference time, a conflict occurs when the recording device system time is reset, since data cannot be recorded with overlapping time stamps. In FIG. 1 for instance, if the recording device system time were to be reset from 1:30 to 1:20 to match the reference time, subsequently recorded images would be associated and stored with time stamps of 1:20 to 1:30 despite the fact that these time stamps were already previously associated and stored with other images.

Because time stamps are used for search and synchronization functions, they may not overlap. Therefore, in the above example, only one set of images would be recorded with a time stamp of 1:20 to 1:30. Certain images received from the surveillance camera during the period of time between the time disparity period, or the time difference between the recording device system time and the reference time, would be overwritten or ignored by the recording device. In either case, the images would be irrevocably lost.

Figure 2:
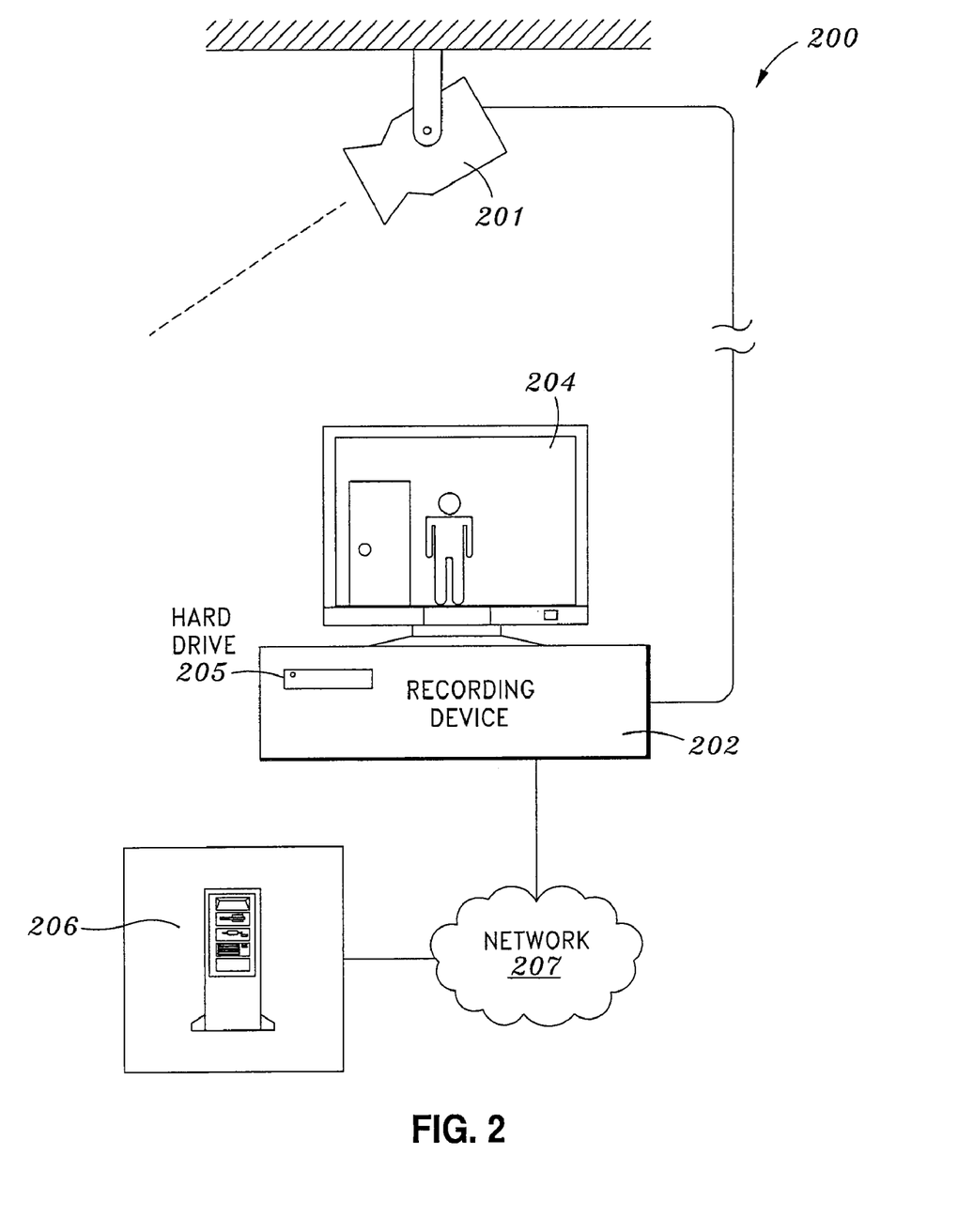
FIG. 2 illustrates an exemplary surveillance camera system including a recording device.

FIG. 2 illustrates an exemplary surveillance camera system 200. The camera system 200 includes surveillance camera 201, which is operable to capture images or other streaming data, and to transmit images to a remotely-located recording device 202. The recording device 202 may be, for example, a DVR. The recording device 202 outputs surveillance images captured by the surveillance camera 201 to a display monitor 204, and stores the surveillance images on a storage medium 205 included within the recording device 202. The recording device 202 is also connected to a reference time server 206 via a network 207, to receive reference time information in real-time. The network 207 may be one of many types of networks, such as the Internet.

Figure 3:
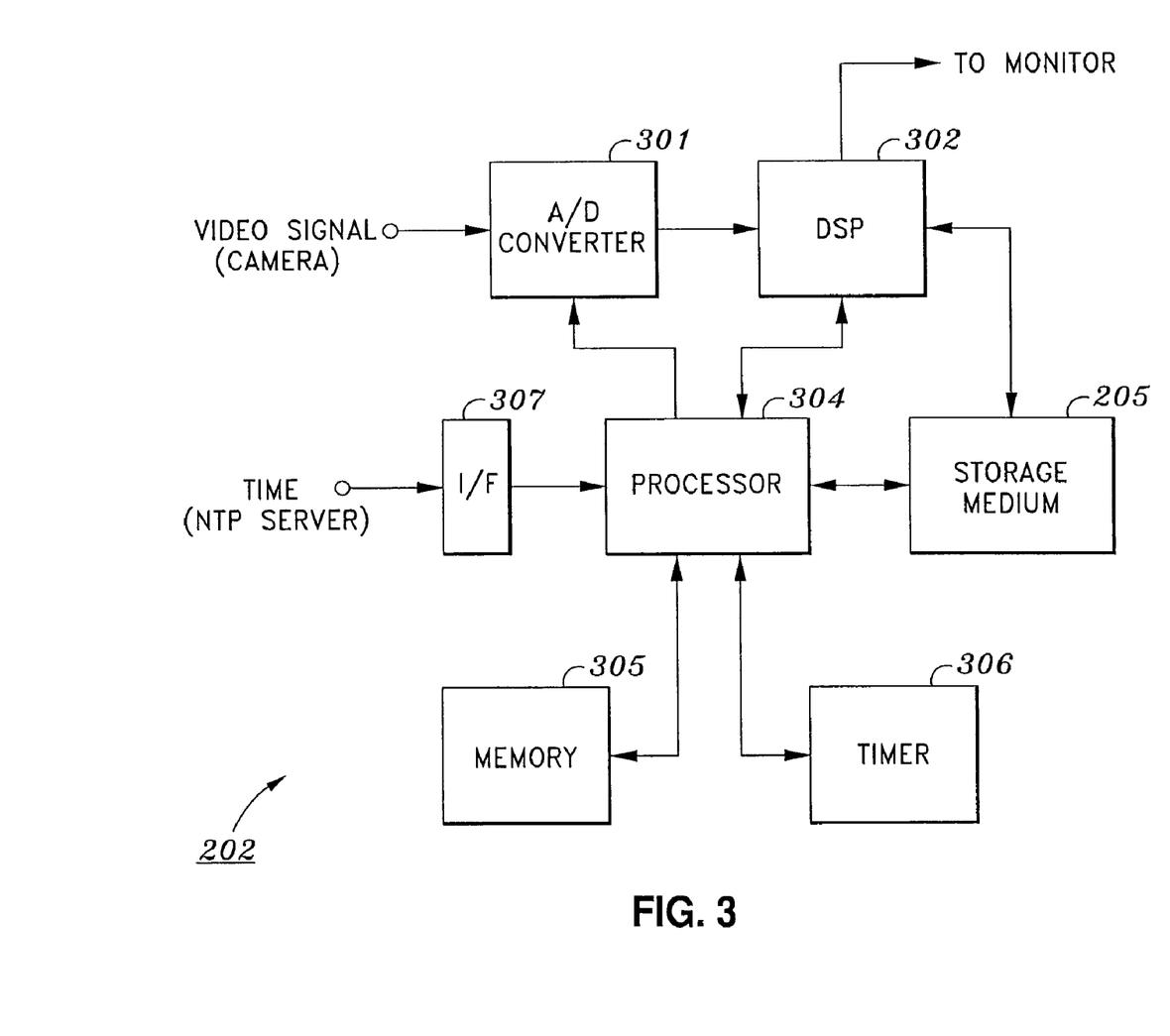
FIG. 3 is a block diagram depicting an example internal architecture of the recording device of FIG. 2.

FIG. 3 is a block diagram depicting an example internal architecture of the recording device 202, which includes an analog-to-digital ("A/D") converter 301, a Digital Signal Processor ("DSP") 302, a storage medium 205, a processor 304, a memory 305, a timer 306, and an interface 307. In order to facilitate the search for images recorded on the storage medium 205, the processor 304 associates a time stamp with each of the images received from the camera, where the time stamp is based upon the recording device system time, and where the recording device system time is itself determined by the timer 306. The recording device 202 receives a reference time from the reference time server 206 in real-time, and adjusts or resets the recording device system time to match the reference time. In one example, the reference time is NTP time, and the reference time server 206 is an NTP server.

When the recording device 202 operates in the state in which the recording device system time is earlier than the reference time, for example when the recording device system time reads 1:30 and the reference time reads 1:40, the recording device system time is adjusted or reset to 1:40 from 1:30. In this situation, images recorded when the recording device system time reads up to 1:30 are also recorded on the storage medium 205 with a time stamp of up to 1:30. Images recorded after the recording device system time is reset to 1:40 from 1:30 are recorded on the storage medium 205 with a time stamp of 1:40 or above. No images are associated or stored with a time stamp between 1:30 and 1:40, since the recording device system time jumps from 1:30 to 1:40 upon receiving the new reference time. Unlike the situation illustrated in FIG. 1, continuous surveillance images are still recorded on the storage medium 205 of the recording device 202 during the time disparity period, without actual discontinuity or data loss.

In the situation where the recording device system time is ahead of a reference time, data may be recorded on the recording device at a reduced sampling rate or frame rate. In contrast to the recording device system time, the time stamp would pass more slowly during this down-sampling period until the recording device system time can be reset to match the reference time without suffering catastrophic loss of image data. In general, the duration in which data is recorded at the reduced sampling rate depends on the difference time D between the recording device system time and the reference time, and a down-sampling rate N.

Assuming that passing time is expressed as time t, the reference time $R_1(t)$ may be expressed as shown below in Equation (3):

$$R_1(t) = t \quad (3)$$

Recorded time $R_2(t)$, which is made to pass at $1/N^{th}$ of the original rate during the down-sampling period, may be expressed as shown below in Equation (4):

$$R_2(t) = \frac{t}{N} + D \quad (4)$$

When the recording device 202 operates in a down-sampling mode, and based upon combining Equations (3) and (4), the time T required until the reference time coincides with the recording device system time is expressed in Equation (1), below:

$$T = \frac{(D \times N)}{(N - 1)}. \quad (1)$$

Using Equation (1), for example, where the difference time D between the reference time and the recording device system time is 10 minutes and the down-sampling rate N is 2, the time T required until the reference time coincides with the recording device system time is 20 minutes. In another example, where the difference time D between the reference time and the recording device system time is 10 minutes and the down-sampling rate N is 3, the time T required until the reference time coincides with the recording device system time is 15 minutes.

Thus, according one implementation, images that are each associated with a recording device system time are received, the recording device records the images at an original rate, a reference time is determined, and a difference time D representing an amount of time that the recording device system time is ahead of the reference time is calculated. A down-sampling rate N is determined, and a time T to reconcile the recording device system time with the reference time is calculated based upon the down-sampling rate N and the difference time D. The images recorded by the recording device are down-sampled at 1/N of the original rate, and the images are stored.

When the recording device 202 operates in a time mode, the time T required until the reference time coincides with the recording device system time is predetermined, and the down-sampling rate is determined using Equation (2), below:

$$N = \frac{T}{(T - D)}. \quad (2)$$

Using Equation (2), for example, when the difference time D between the reference time and the recording device system time is 10 minutes and the time T required until the reference time coincides with the recording device system time is 30 minutes, the down-sampling rate N is 3/2, such that only two of each three captured images are recorded. In Equation (2), time T should be larger than difference time D. Although time T and the difference time D are described as rational numbers and the down-sampling rate N is described as a fraction, these variables may represent any number.

Thus, according to another general implementation, images that each are associated with a recording device system time are received at a recording device, the recording device records the images at an original rate, a reference time is determined, and a difference time D representing an amount of time that the recording device system time is ahead of the reference time is calculated. A time T is determined, and a down-sampling rate N to reconcile the recording device system time with the reference time is calculated based upon the time T and the difference time D. Images recorded by the recording device are down-sampled at 1/N of the original rate, for a period of time T, and the images are stored.

The user of the recording device may select whether to operate in a down-sampling mode or a time mode, via a user setting. When the down-sampling mode is selected and a down-sampling rate N is designated, the time T which is required until the reference time coincides with the time stamp is calculated. When the time mode is designated and the time T is determined, a down-sampling rate N is calculated.

Since down-sampling rate N and time T are inversely proportional, the recording device system time can be made to coincide with the reference time in a relatively short time period when down-sampling rate N is relatively large, although the temporal resolution of data may be degraded because of the decreased sampling rate. Conversely, when down-sampling rate N is relatively small, the temporal resolution of data is not degraded considerably, but the time T required until the recording device system time coincides with the reference time increases.

Figure 4:
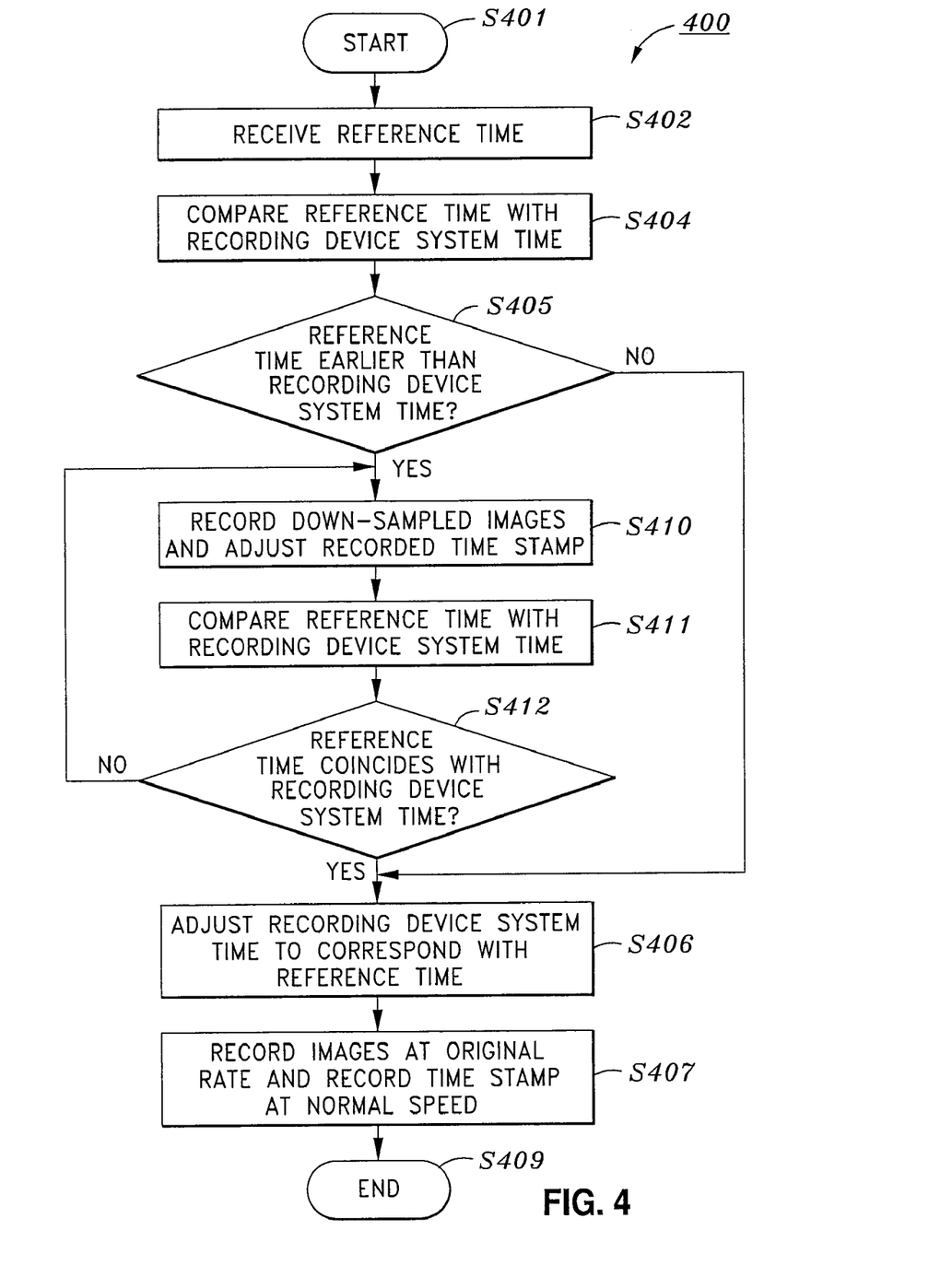
FIG. 4 is a flowchart illustrating an exemplary method of adjusting system information.

FIG. 4 is a flowchart illustrating a method 400 of adjusting system information according to one example implementation. The method begins (S401), and a reference time is received (S402). In one example, processor 304 of the recording device 202 receives NTP time information from NTP server 206, via interface 307. The reference time is compared with the recording device system time (S404).

Based upon the comparison, if the reference time is determined to be later than the recording device system time (S405), the recording device system time is adjusted to coincide with the reference time (S406), the recording device captures and records images at the original rate, and records a time stamp for each image at a normal speed (S407), and the method 400 ends (S409). In one example, processor 304 controls time 306 to match the reference NTP time received from NTP server 206.

If the reference time is determined to be earlier than the recording device system time (S405), the images are down-sampled and recorded at 1/N of the original sampling rate, and the recorded time associated with the images, also referred to as RECORD_TIME, is also adjusted to 1/N of the original speed (S410).

Figure 5:
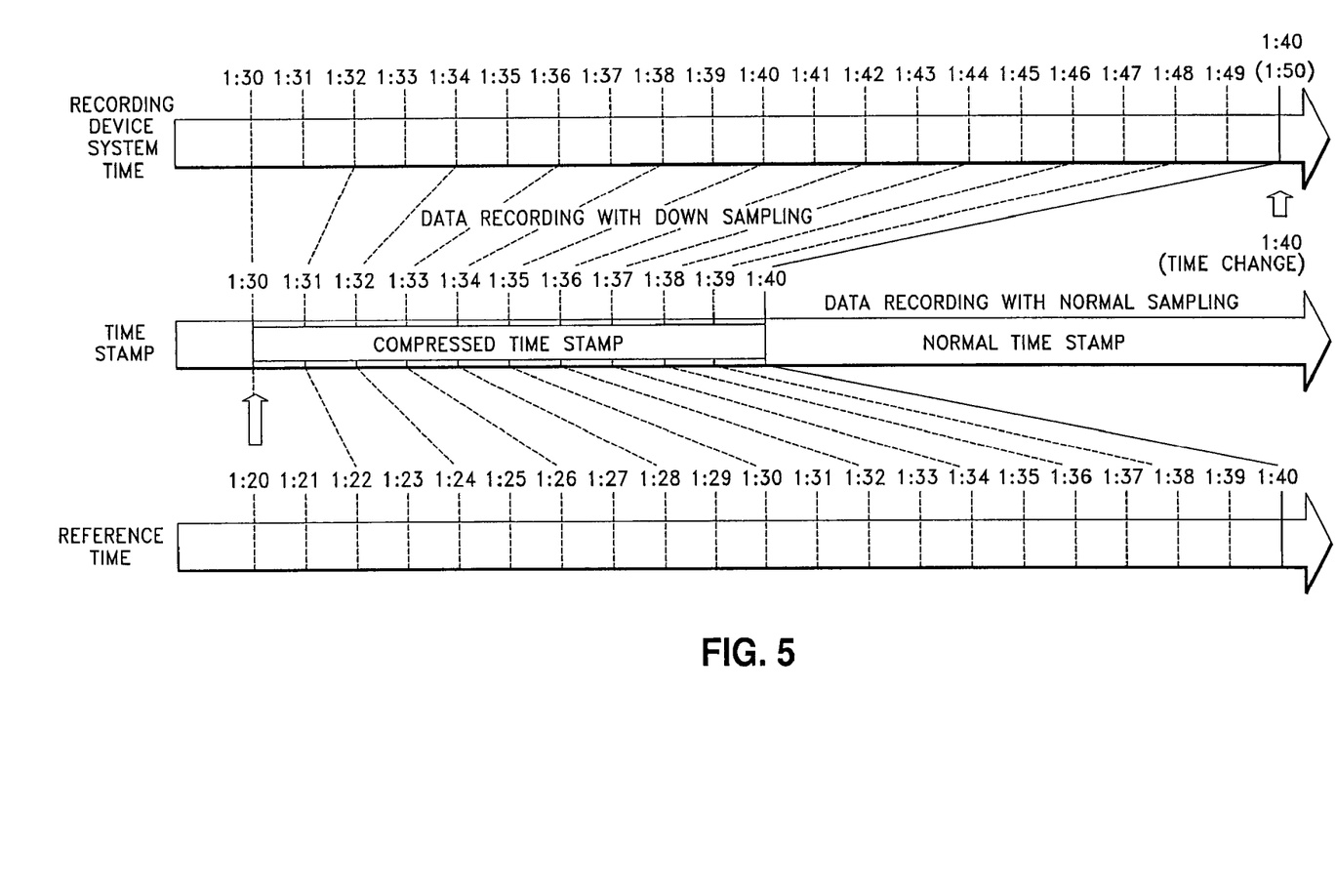
FIG. 5 is a diagram illustrating the adjustment of system information.

Referring ahead briefly, FIG. 5 is a diagram illustrating one example of the adjustment of system information. Since the recording device system time is initially 1:30 and the NTP reference time is initially 1:20, the processor 304 controls the DSP 302 such that images are down-sampled at 1/N of the original speed, and the passing of the time stamp is adjusted to 1/N of the original speed of the timer. In FIG. 5, the speed of the passing of the time stamp is adjusted to ½ of the original speed, and the data is sampled at ½ of the original sampling rate (referred to as double down-sampling) and recorded on the storage medium 205 of the recording device 202.

As a result of this time reconciliation operation, as the recording device system time normally increases from 1:30 to 1:50, data is sampled at ½ of the original sampling rate, and the time stamp is recorded in association with the recorded data while regularly increasing from 1:30 to 1:40, at which point the NTP reference time has increased from 1:20 to 1:40.

Returning to FIG. 4, the recording device continuously compares the reference time, which is passing at a normal rate, with the time stamp, which passes at a compressed speed in relation to the recording device system time, in order to continuously determine whether the reference time coincides with the recording device system time (S411). For example, the processor 304 of the recording device 202 continuously compares the normally-passing reference time with the time stamp, which passes at ½ of the speed of the recording device system time, as determined by the timer 306, to determine whether the NTP reference time coincides with the time stamp. As shown in FIG. 5, when 20 minutes have elapsed, the NTP reference time is determined to be 1:40 and the time stamp is determined to be 1:40 (S411), so the timer 306 is controlled such that the system time is adjusted to 1:40 (S406).

Referring to FIG. 5, when the recording device system time is 1:30, the NTP reference time is 1:20 and the time difference is 10 minutes. While the system time is made to coincide with the NTP reference time, an operation of recording data is performed at ½ of the original sampling rate, and the time stamp passes at ½ of the speed of the passing of the recording device system time. Accordingly, the time required until the NTP reference time coincides with the time stamp is 20 minutes.

For example, if a original rate in a normal recording operation is 30 frames per second, data is recorded at a frame rate of 15 frames per second while the system time is adjusted to coincide with the reference time. Since the time stamp is passing at half the speed of the recording device system time or the reference time, the time stamp indicates 1:35 when the recording device system time indicates 1:40 and the reference time indicates 1:30. When the recording device system time indicates 1:50, the reference time and the time stamp both indicate 1:40. At that point, the time stamp coincides with the reference time. Put another way, 20 minutes of data (corresponding to 1:30 to 1:50 for the recording device system time, and from 1:20 to 1:40 for the reference time) is recorded with a time stamp range of 1:30 to 1:40.

The time reconciliation approach may be occasionally performed, perhaps once a day, week, or month, to periodically reconcile the recording device system time with the reference time. In one example implementation, time reconciliation occurs daily at dawn, when there is usually little variation in surveillance images. Alternatively, the recording device may periodically access a reference time server to adjust the system time to a reference time when the difference between the recording device system time and the reference time is greater than a predetermined amount.

Furthermore, the recording device may perform time reconciliation when the difference between the recording device system time and the reference time falls within a predetermined range. Alternatively, when the difference between the recording device system time and the reference time is substantial, the recording device may notify a user of the difference, and allow the user to determine whether to perform the time reconciliation function.

The down-sampling rate N may be a rational number or an integer, in order to facilitate interpolation of the samples. If an example implementation, time T is set to a value 1.5× or 2× of difference time D, so that down-sampling rate N is calculated as a rational number using Equation (2). Using the time reconciliation approach, recording device system times can be adjusted to match a reference time without loss of data, and a user can easily set a preferred time T to effectuate synchronization.

Figure 6:
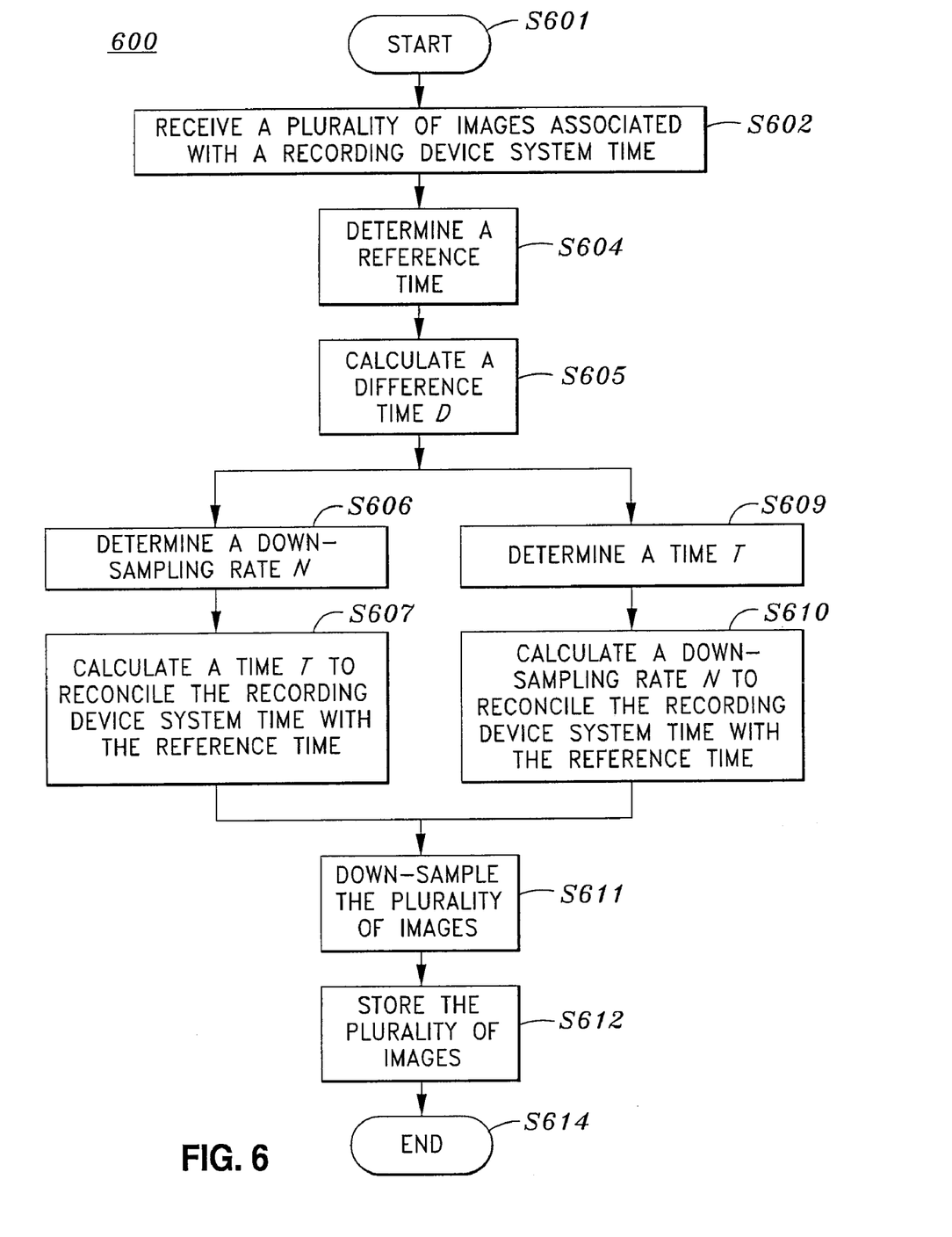
FIGS. 6 and 7 are flowcharts illustrating exemplary methods.

FIG. 6 is a flowchart illustrating another exemplary method. Briefly, images that are each associated with a recording device system time are received at a recording device, the recording device records the images at an original rate, a reference time is determined, and a difference time D representing an amount of time that the recording device system time is ahead of the reference time is calculated. In one alternative implementation, a down-sampling rate N is determined, and a time T to reconcile the recording device system time with the reference time is calculated based upon the down-sampling rate N and the difference time D. In another alternative implementation, a time T is determined, and a down-sampling rate N to reconcile the recording device system time with the reference time is calculated based upon the time T and the difference time D. In both alternative implementations, the images recorded by the recording device are down-sampled at 1/N of the original rate, and the images are stored.

In more detail, when method 600 begins (S601), images associated with a recording device system time are received at a recording device (S602) that records the images at an original rate. The recording device may be a digital video recorder. A reference time is determined (S604), such as by accessing a network time from an NTP server. A difference time D representing an amount of time that the recording device system time is ahead of the reference time is calculated (S605).

A down-sampling rate N is determined (S606), and a time T to reconcile the recording device system time with the reference time is calculated based upon the down-sampling rate N and the difference time D (S607), such as by using Equation (1). Alternatively, a time T is determined (S609), and a down-sampling rate N to reconcile the recording device system time with the reference time is calculated based upon the time T and the difference time D (S610), such as by using Equation (2). The down-sampling rate N may be an integer.

The images recorded by the recording device are down-sampled at 1/N of the original rate (S611). After the images have been down-sampled for time T, the recording device system time is reconciled with the reference time. The images are stored (S612), and method 600 ends (S614).

Figure 7:
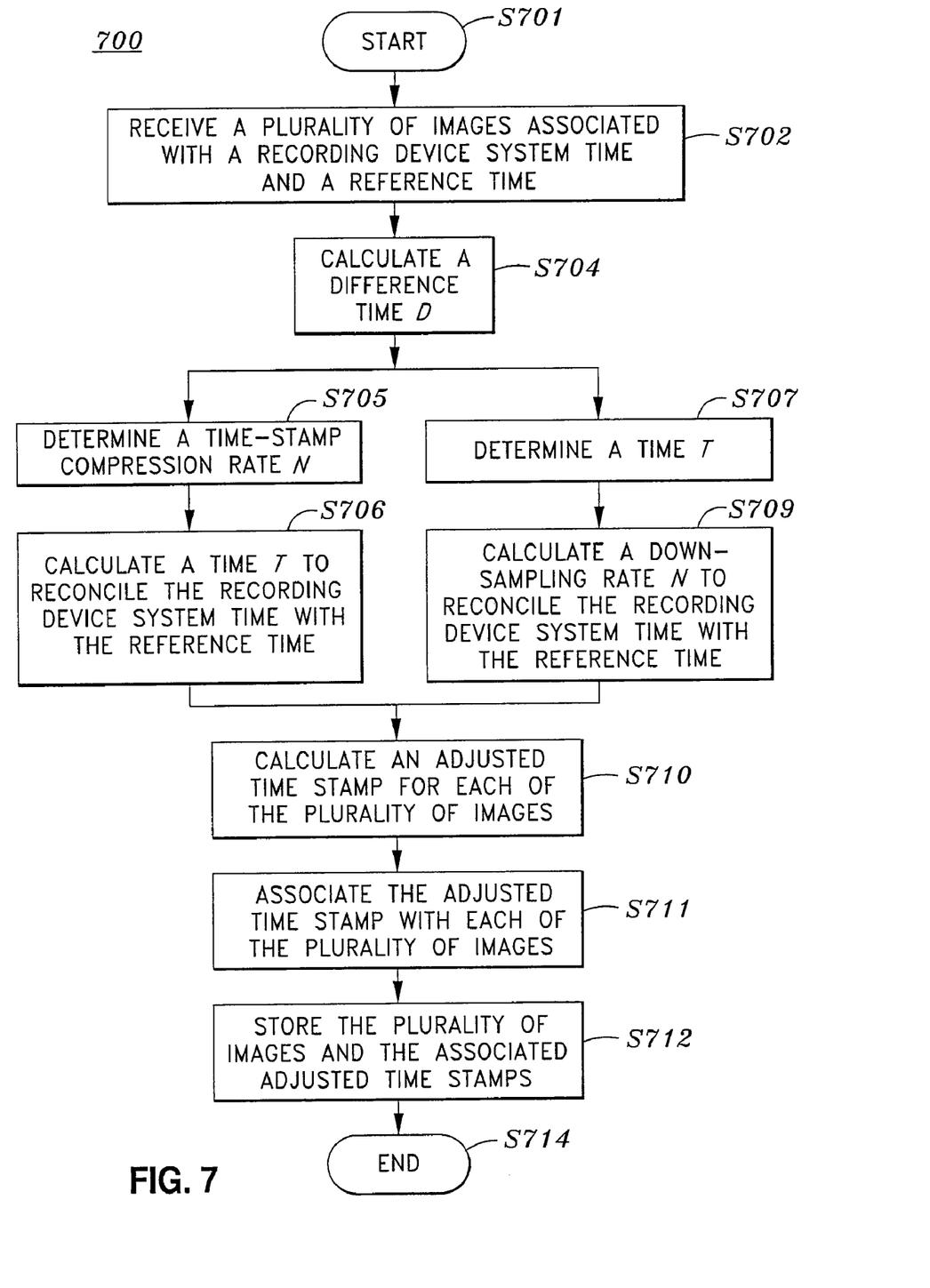

FIG. 7 is a flowchart illustrating another exemplary method 700. Briefly, images associated with a recording device system time and a reference time are received, and a difference time D representing an amount of time that the recording device system time differs from the reference time is calculated. In one alternative implementation, a time-stamp compression rate N is determined, and a time T to reconcile the recording device system time with the reference time is calculated based upon the time-stamp compression rate N and the difference time D. In another alternative implementation, a time T is determined, and a time compression rate N to reconcile the recording device system time with the reference time is calculated based upon the time T and the difference time D. In both alternative implementations, an adjusted time stamp is calculated for each of the images based upon the time-stamp compression rate N and the recording device system time, the adjusted time stamp is associated with each of the images, and the images and the adjusted time stamp associated with each of the images are stored.

In more detail, when method 700 begins (S701), images that are associated with a recording device system time and a reference time are received (S702). A difference time D representing an amount of time that the recording device system time differs from the reference time is calculated (S704). A time-stamp compression rate N is determined (S705), and a time T to reconcile the recording device system time with the reference time is calculated based upon the time-stamp compression rate N and the difference time D (S706). Alternatively, a time T is determined (S707), and a time compression rate N to reconcile the recording device system time with the reference time is calculated based upon the time T and the difference time D (S709).

An adjusted time stamp is calculated for each of the images based upon the time-stamp compression rate N and the recording device system time (S710). The adjusted time stamp is associated with each of the images (S711). The images and the adjusted time stamp associated with each of the images are stored (S712), and method 700 ends (S714).

Figure 8:
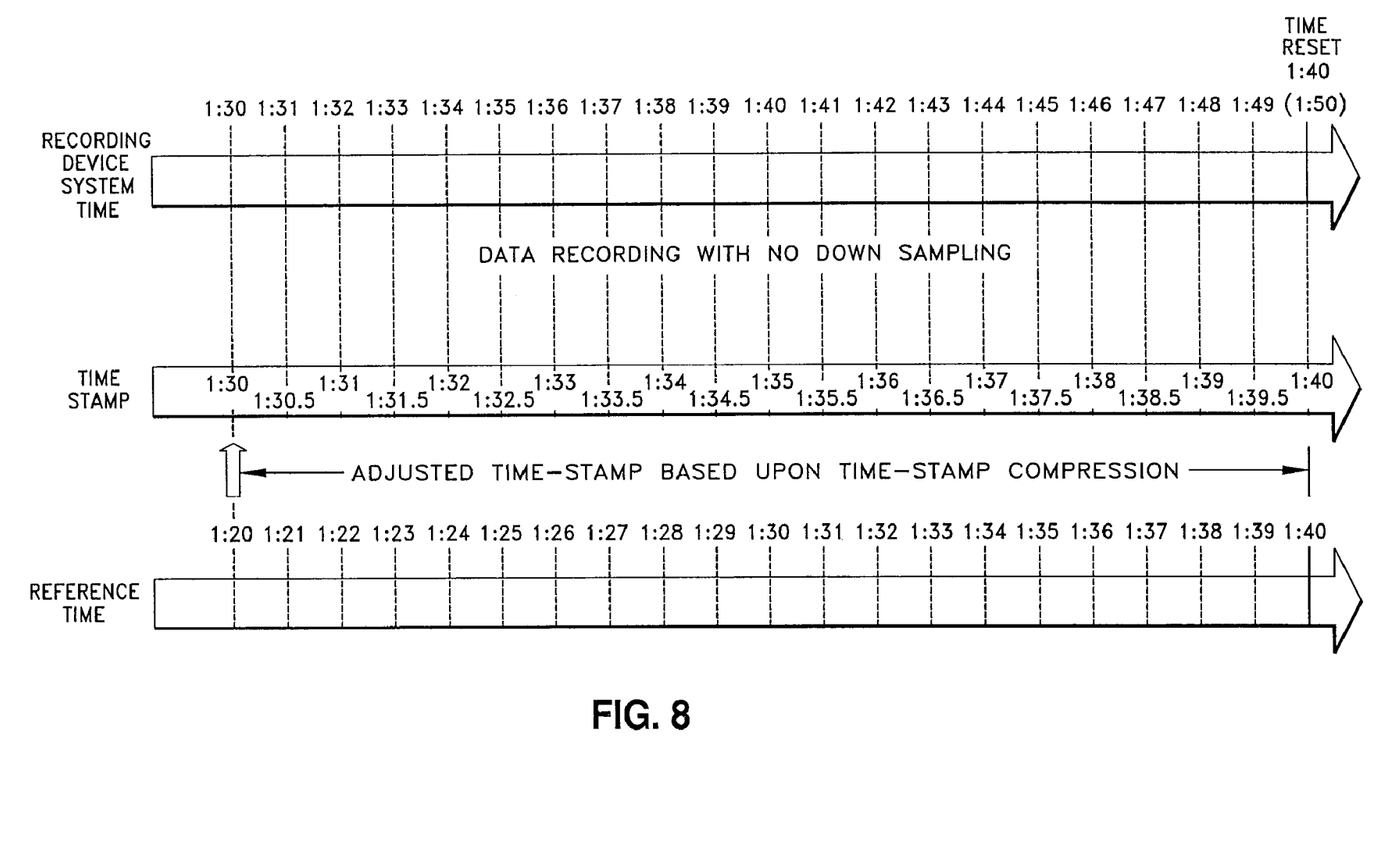
FIG. 8 is a diagram illustrating another example of the adjustment of system information.

FIG. 8 is a diagram illustrating another example of the adjustment of system information. Initially, the recording device system time reads 1:30, and reference time reads 1:20. Prior to the recording device system time of 1:30, images are recorded with time stamps that coincide with the recording device system time. For example, at recording device system time 1:29, the time stamp associated with an image also reads 1:29.

When recording device system time reads 1:30, a reference time is accessed from the reference time server. The reference time reads 1:20 when the recording device system time reads 1:30. Instead of down-sampling the images which are being recorded, an adjustment is merely made to the time stamps which are associated with the recorded images, such that the passage of time for the time stamps is compressed or otherwise modified, according to a time-stamp compression rate N. Although images are continuously recorded, without down-sampling, from the moment from recording device system time reads 1:30 until the moment the recording device system time reaches 1:50, the time stamps associated with the images recorded during this period are associated with time stamps reading 1:30 to 1:40. In this regard, the passage of time for the time stamps proceeds at half the speed of the passage of time for the recording device system time.

When the recording device system time reaches 1:50, the time stamp associated with a recorded image reads 1:40 and the reference time reads 1:40. The recording device system time is then reset or adjusted to match the reference time. Using this enhanced time reconciliation approach, no image data is lost, and time stamps associated with the image data are continuous. Notably, using this approach, time reconciliation may occur in the case where the reference time lags the recording device system time, or where the recording device system time lags the reference time.

Although time reconciliation has been described using the example of a DVR, other devices which record data on a time basis, such as televisions configured to reproduce and record received broadcasts in real time, devices capable of recording data according to a schedule, or other recording devices capable of time-based searches, would also benefit from this enhanced approach.

The arrangements have been described with particular illustrative implementations. It is to be understood that the concepts and implementations are not however limited to the above-described implementations and that various changes and modifications may be made.

What is claimed is:

1. A method comprising:
   receiving, at a recording device, images that each are associated with a recording device system time, the recording device recording the images at an original rate;
   determining, by the recording device, a reference time;
   calculating, by the recording device, a difference time D representing an amount of time that the recording device system time is ahead of the reference time;
   determining, by the recording device, a down-sampling rate N;
   calculating, by the recording device, a time T to reconcile the recording device system time with the reference time based upon the down-sampling rate N and the difference time D;
   down-sampling, by the recording device, the images recorded by the recording device at 1/N of the original rate; and
   storing, by the recording device, the down-sampled images.

2. The method of claim 1, wherein the down-sampling rate N is an integer.

3. The method of claim 1, wherein the recording device is a digital video recorder.

4. The method of claim 1, wherein the reference time is determined via a network time protocol server.

5. The method of claim 1, wherein the time T is calculated as:

$$T = \frac{(D \times N)}{(N-1)}.$$

6. The method of claim 1, further comprising reconciling the recording device system time with the reference time after the images have been down-sampled for time T.

7. A method comprising:
   receiving, at a recording device, images that each are associated with a recording device system time, the recording device recording the images at an original rate;
   determining, by the recording device, a reference time;
   calculating, by the recording device, a difference time D representing an amount of time that the recording device system time is ahead of the reference time;

determining, by the recording device, a time T;
calculating, by the recording device, a down-sampling rate N to reconcile the recording device system time with the reference time based upon the time T and the difference time D;
down-sampling, by the recording device, the images recorded by the recording device at 1/N of the original rate, for a period of time T; and
storing, by the recording device, the down-sampled images.

8. The method of claim 7, wherein the down-sampling rate N is calculated as:

$$N = \frac{T}{(T-D)}.$$

9. A recording device comprising:
an analog-to-digital converter configured to receive images generated at an original rate;
a timer configured to measure a recording device system time for each of the images;
an interface configured to receive a reference time for each of the images;
a processor configured to:
  determine a reference time for each of the images,
  calculate a difference time D representing an amount of time that the recording device system time is ahead of the reference time for each of the images,
  determine a down-sampling rate N,
  calculate a time T to reconcile the recording device system time with the reference time based upon the down-sampling rate N and the difference time D, and
  down-sample the images received by the analog-to-digital converter at 1/N of the original rate; and
a storage medium configured to record the down-sampled images.

10. A recording device comprising:
an analog-to-digital converter configured to receive images generated at an original rate;
a timer configured to measure a recording device system time for each of the images;
an interface configured to receive a reference time for each of the images;
a processor configured to:
  determine a reference time;
  calculate a difference time D representing an amount of time that the recording device system time is ahead of the reference time;
  determine a time T;
  calculate a down-sampling rate N to reconcile the recording device system time with the reference time based upon the time T and the difference time D, and
  down-sample images received by the analog-to-digital converter at 1/N of the original rate, for a period of time T; and
a storage medium configured to record the down-sampled images.

11. A method comprising:
receiving, at a recording device, images that each are associated with a recording device system time and a reference time,
calculating, by the recording device, a difference time D representing an amount of time that the recording device system time differs from the reference time;
determining, by the recording device, a time-stamp compression rate N;
calculating, by the recording device, a time T to reconcile the recording device system time with the reference time, based upon the time-stamp compression rate N and the difference time D;
calculating, by the recording device, an adjusted time stamp for each of the images based upon the time-stamp compression rate N and the recording device system time;
associating, by the recording device, the adjusted time stamp with each of the images; and
storing, by the recording device, the images and the adjusted time stamp associated with each of the images.

12. A method comprising:
receiving, at a recording device, images that each are associated with a recording device system time and a reference time;
calculating, by the recording device, a difference time D representing an amount of time that the recording device system time differs from the reference time;
determining, by the recording device, a time T;
calculating, by the recording device, a time compression rate N to reconcile the recording device system time with the reference time based upon the time T and the difference time D;
calculating, by the recording device, an adjusted time stamp for each of the images based upon the time-stamp compression rate N and the recording device system time;
associating, by the recording device, the adjusted time stamp with each of the images; and
storing, by the recording device, the images and the adjusted time stamp associated with each of the images.

13. A recording device comprising:
an analog-to-digital converter configured to receive images that each are associated with a recording device system time and a reference time;
a processor configured to:
  calculate a difference time D representing an amount of time that the recording device system time differs from the reference time,
  determine a time-stamp compression rate N,
  calculate a time T to reconcile the recording device system time with the reference time based upon the time-stamp compression rate N and the difference time D,
  calculate an adjusted time stamp for each of the images based upon the time-stamp compression rate N and the recording device system time, and
  associate the adjusted time stamp with each of the images; and
a storage medium configured to store the images and the adjusted time stamp associated with each of the images.

14. A recording device comprising:
an analog-to-digital converter configured to receive images that each are associated with a recording device system time and a reference time;
a processor configured to:
  calculate a difference time D representing an amount of time that the recording device system time differs from the reference time,
  determine a time T,
  calculate a time compression rate N to reconcile the recording device system time with the reference time based upon the time T and the difference time D, calculate an adjusted time stamp for each of the images based upon the time-stamp compression rate N and the recording device system time, and associate the adjusted time stamp with each of the images; and a storage medium configured to store the images and the adjusted time stamp associated with each of the images.

* * * * *